United States Patent [19]
Sato

[11] Patent Number: 4,894,965
[45] Date of Patent: Jan. 23, 1990

[54] METHOD FOR RESTRAINING VIBRATION OF A BUILDING AND STRUCTURE THEREFOR

[75] Inventor: Takanori Sato, Tokyo, Japan

[73] Assignee: Shimizu Construction Co., Ltd., Tokyo, Japan

[21] Appl. No.: 179,438

[22] Filed: Apr. 8, 1988

[30] Foreign Application Priority Data

Apr. 10, 1987 [JP]  Japan ............................ 62-88396
Apr. 27, 1987 [JP]  Japan ........................... 62-63917[U]

[51] Int. Cl.⁴ ............................................. E04B 1/98
[52] U.S. Cl. ............................................. 52/167 DF
[58] Field of Search ............... 52/1, 2, 167; 248/562, 248/631, 636, 638; 188/279, 311

[56] References Cited

U.S. PATENT DOCUMENTS

| | | | |
|---|---|---|---|
| 2,161,811 | 6/1939 | Grebe | 188/279 |
| 3,245,177 | 4/1966 | Chen | 188/322.5 |
| 3,266,600 | 8/1966 | Brunner | 188/322.5 |
| 3,284,964 | 11/1966 | Saito | 52/2 |
| 3,796,017 | 3/1974 | Meckler | 52/167 |
| 4,226,554 | 10/1980 | Vandiver | 405/195 |
| 4,783,937 | 11/1988 | Sato | 52/167 |

FOREIGN PATENT DOCUMENTS

2194017 2/1988 United Kingdom ................. 52/167

*Primary Examiner*—James L. Ridgill, Jr.
*Attorney, Agent, or Firm*—Hoffmann & Baron

[57] ABSTRACT

The present invention provides a vibration restraining structure comprising a pair of wall members defining an inner space therebetween, separation walls separating the inner space into chambers, and a liquid retained in the chambers and having a free surface.

The liquid retained in the chambers slosh as the building vibrates. Vibrational energy of the building is transferred to the liquid and generates sloshing thereof. As a result, vibration of the building is restrained. Vibration of the building is restrained most effectively when a natural frequency of the sloshing coincides with a natural frequency of the structure. In other words, the building and the liquid form a unitary oscillating system, and a fundamental vibration mode of the system is a mode wherein sloshing occurs together with a displacement of the building.

The method for restraining vibration of a building comprises a step of providing the above-mentioned structures at locations where the model displacement of the building is significant.

22 Claims, 7 Drawing Sheets

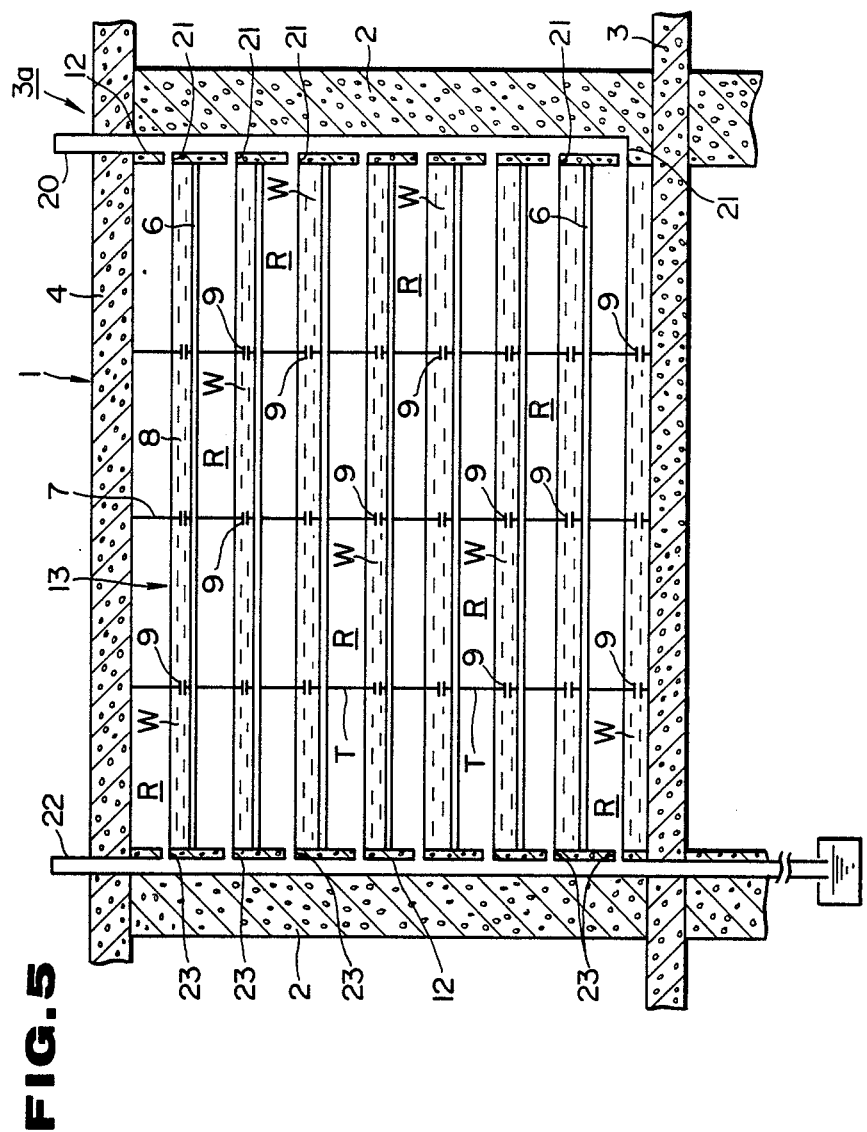

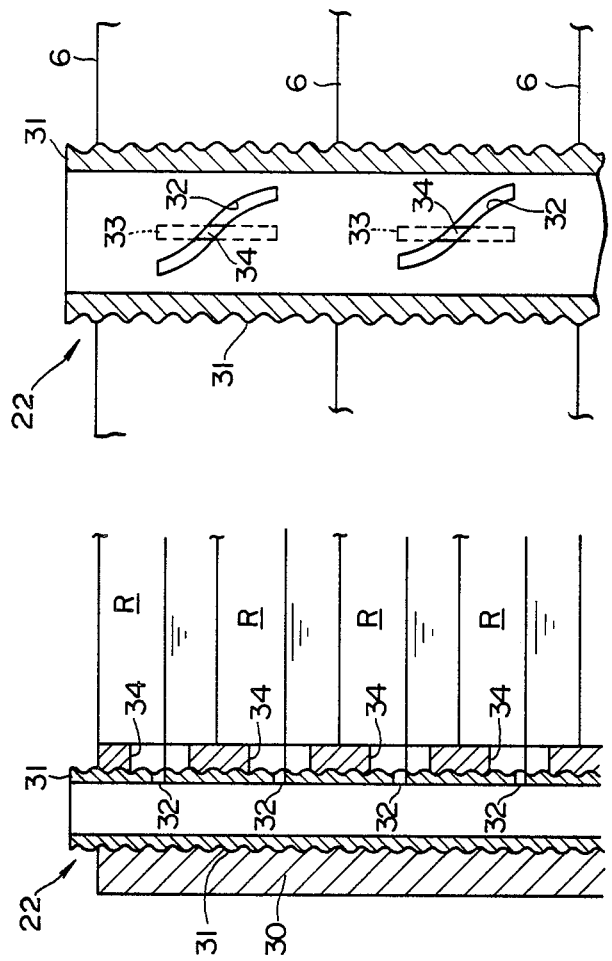

METHOD FOR RESTRAINING VIBRATION OF A BUILDING AND STRUCTURE THEREFOR

BACKGROUND OF THE INVENTION

The present invention relates to a method and a structure for restraining a vibration of a building.

Buildings and civil structures are induced to vibrate by earthquakes, winds, traffic, and other vibration sources. On the other hand, most of modern buildings and structures have more flexibility and less damping compared to conventional buildings by virtue of affluent flexibility in modern structural members and precise construction techniques. However, because modern buildings permit larger displacements than before, vibration in modern buildings tend to become larger than in conventional buildings. Then, excessive vibrations may occur and cause such various inconveniences and problems in the building as damage on nonstructural members of the building, misoperation of equipment installed in the building and uncomfortable feeling of motion by the occupants etc. Reduction of vibration is desirable for the structural members of the building also.

In order to resolve these inconveniences, present inventors already proposed a vibration restraining apparatus for buildings in a Japanese Patent Application 60-241045, FIG. 1. By the Patent Application, disclosed is a vibration restraining apparatus comprising a tank and a liquid retained in the tank to be installed at a roofing of the building. As the building vibrates, the vibrational energy of the building is transmitted to the liquid, and the liquid, having a sloshing natural frequency identical to that of the building, sloshes resonantly with the building. Consequently, the vibration of the building is restrained as loosing the vibrational energy. Weight of the liquid retained in the tank had better be larger than 1% of the building so as to restrain vibration of the building effectively.

A problem as to foregoing conventional apparatus and methods for restraining vibration of a building is that the apparatus requires a large space to be installed in and consequently the space to install the apparatus is found only at the top of the building.

Another problem in conventional apparatus and methods is that a number of such tanks have to be installed because the size of the liquid tank, which is relatively small in general, is determined in order to make the sloshing frequency thereof equal to that of the building and because liquid of 1% by weight of the building has to be retained in tanks in total.

A further problem is that the apparatus effectively restrains only the first mode of the building as a logical consequence, when the tanks are installed at the top of the building.

SUMMARY OF THE INVENTION

The present invention is directed to a method and a structure for restraining a vibration of the building by providing a space-saving wall-like structure retaining liquid therein and adjusting a sloshing frequency of the liquid so that it coincides with a natural frequency of the building.

In achieving practical application of the present invention, the vibration restraining structure may comprise a pair of wall members defining an inner space therebetween, separation walls separating the inner space into chambers, and a liquid retained in the chambers and having a free surface.

The liquid retained in the chambers sloshes as the building vibrates. Vibrational energy of the building is transferred to the liquid and generates sloshing thereof. As a result, vibration of the building is restrained. Vibration of the building is restrained most effectively when a natural frequency of the sloshing coincides with a natural frequency of the structure. In other words, the building and the liquid form a unitary oscillating system, and a fundamental vibration mode of the system is a mode wherein sloshing occurs together with a displacement of the building. Eigen mode of the oscillating system, as defined in a complex space, comprises a displacement of the sloshing 90 degrees out of phase as regards the displacement of the building as far as an effective mass of the liquid is far less than that of the building and the natural frequency of the sloshing coincides with that of the building. Displacement of the building in the fundamental mode of the unitary oscillating system is smaller than that of the building without the liquid. Consequently, the vibration becomes smaller when the building is provided with the vibration restraining structure.

Further objects and advantages of the present invention will appear hereinafter.

BRIEF DESCRIPTION OF THE DRAWINGS

FIG. 5 is a longitudinal elevational view of a modified embodiment of a vibration restraining structure according to the present invention.

FIG. 8 shows a sleeve and an inner tube according to a further modified embodiment of the present invention.

FIG. 9 shows slits formed in a sleeve and an inner tube according to a further modified embodiment of the present invention.

FIG. 10(A) and 10(B) show time histories of displacement of a building with or without a vibration restraining structure of the present invention.

DETAILED DESCRIPTION OF THE PREFERRED EMBODIMENTS

Preferred embodiments of the present invention will now be explained in detail referring to the attached drawings.

Figure 3:
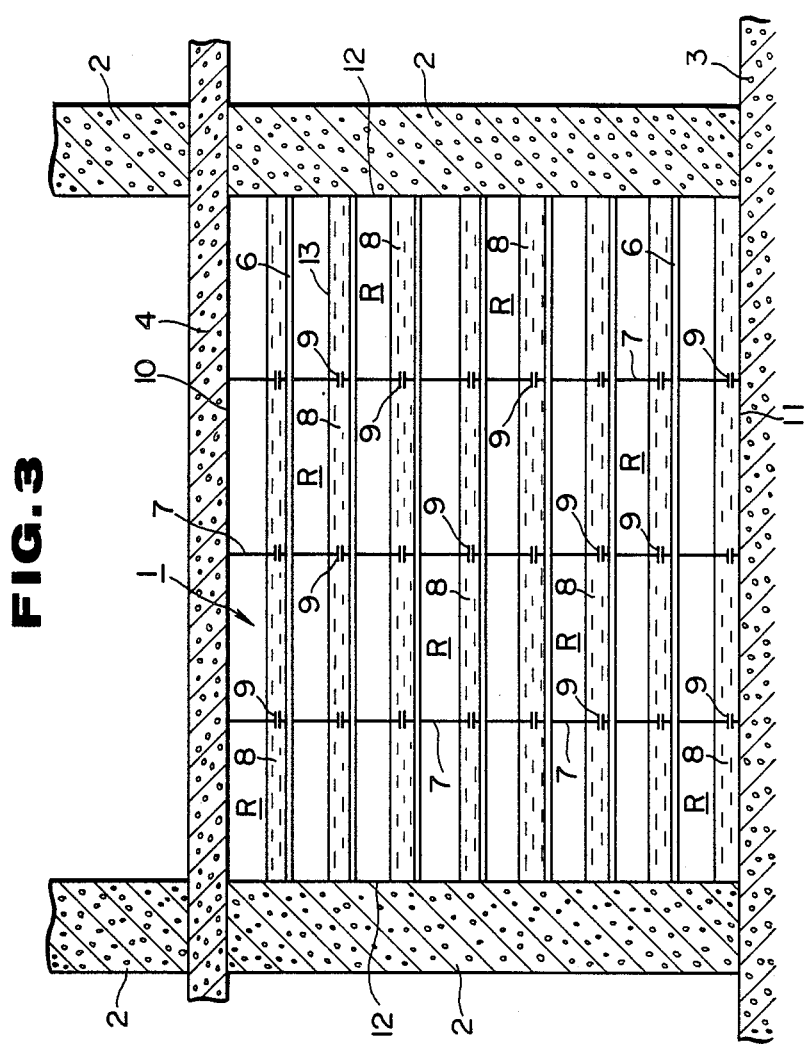
FIG. 3 is a longitudinal elevation view of an embodiment of a vibration restraining structure according to the present invention.
Figure 4:
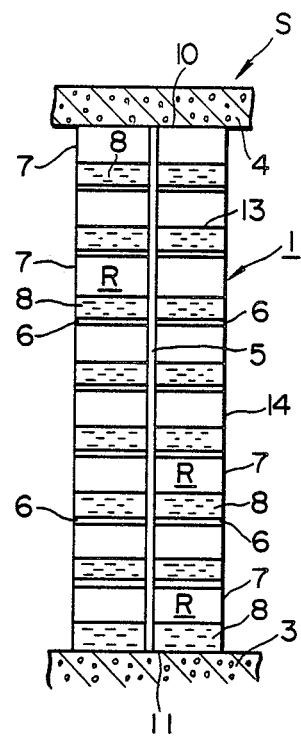
FIG. 4 is a transversal elevation view of the embodiment shown in FIG. 3.

FIG. 3 and FIG. 4 show a preferred embodiment of the present invention. FIG. 3 shows a longitudinal elevation view of the embodiment. A vibration restraining structure 1, having a parallelepiped outward form, is installed in a space defined by a framework of structural members of a building composed of a pair of columns 2, a floor slab 3 and a beam member 4. The vibration restraining structure 1 comprises a top plate 10 touching the beam member 4 from underneath, a bottom plate 11 supported by the floor slab 3, and a pair of side plates 12 being in contact with the pair of columns 2. The vibration restraining structure 1 also comprises a pair of outer wall members 14 (see FIG. 4) perpendicular to the bottom plate 11 and side plates 12 and defining an inner space of the structure 1 thereby. In the inner space of the structure 1, there are provided an inner wall member 5 (see FIG. 4) disposed parallel to the outer wall members and bordered by the top plate 10, the bottom plate 11 and a pair of side plates 12; a plurality of horizontal separation walls 6 disposed horizontally and bordered by the wall members and the side plates 12; and a plurality of vertical separation walls 7 disposed vertically and bordered by the wall members, the top plate and the bottom plate. A plurality of chambers R are defined by pairs of adjacent horizontal separation walls 6, pairs of adjacent vertical separation walls 7, the inner wall member and an outer wall member. The horizontal separation walls 6 and the vertical separation walls 7 are disposed equidistantly. Consequently, the chambers R are in an identical form. Communication holes 9 are formed in vertical separation walls 7, at locations adjacent to lower horizontal separation walls 6, so that chambers R on both sides of the vertical separation walls 7 are communicating to each other through the communication hole 9. Communication holes may be formed also in each portion of inner wall members defining each chamber R, at an elevation similar to the communication holes in the vertical separation wall 7. Therefore, chambers R on a same elevation are communicating to each other through the communication holes 9. A liquid 7 having a free surface 13 is retained in each chamber R. By virtue of the communication holes 9, level of the free surfaces 13 at horizontally lined chambers R are identical.

Preferrably, walls defining chambers R or surface thereof are in a wavy form and the liquid 8 is a viscous liquid in order to improve damping characteristics of the sloshing of the liquid 8. Structural members, that is nonliquid members, of the vibration restraining structure 1 may be made of corrosion resistant material such as plastics or stainless steel so as to avoid inconveniences which may be caused by corrosion thereof. A less volatile liquid may be employed as the liquid 8 so as to ascertain a long term serviceability of the structure 1. The outer wall member 14 may be provided with a scaled window so as to facilitate to check the amount of the liquid 8. Materials of the structural members and the liquid 8 are not restricted to the abovementioned examples and can be selected also on a practical or constructional point of view.

FIG. 4 shows a transversal elevation of the embodiment. The top plate 10, the bottom plate 11 and the pair of outer wall members 14 define the vibration restraining structure 1. The inner wall member 5 is located at a mid-plane between the pair of outer wall members 14. By virtue of communicating holes (not shown) formed in the inner wall member 5, level of the surfaces 13 of water 8 retained in chambers separated by the inner wall member 5 are identical.

Total effective weight of the liquid 8 had better be equal to or higher than 1 percent, preferrably equal to or lower than 2 percent simultaneously, of the total effective weight of the building in order to restrain vibrations of the building effectively. The terms effective weight or effective mass are used hereinafter to signify a modal mass of the liquid or the building which is significant in vibration of a mode concerned.

Operation of the embodiment will now be explained hereinafter.

Figure 2:
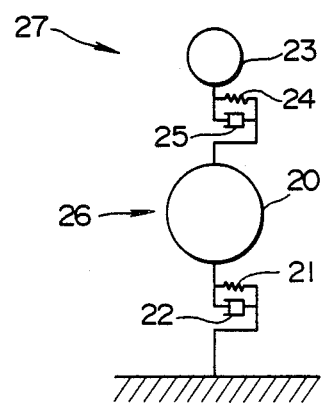
FIG. 2 shows schematically a vibrational characteristics of two-degrees-of-freedom vibrational system.

The building and the vibration restraining structure are modelized simply as shown in FIG. 2. Vibrational characteristics will be discussed hereinafter with reference to the model of FIG. 2 which is a so called two-degree-of-freedom oscillating system. A mass-spring-dashpot system 26 represents schematically vibrational characteristics of a certain mode of the building. A mass 20, a spring 21 and a dashpot 22 represent effective mass, effective stiffness and effective damping of the mode, respectively, which are determined by the structural property of the building. A mass-spring-dashpot system 27 represent a certain mode of the vibration restraining structure, more specifically, sloshing characteristics of the liquid in the vibration restraining structure. A mass 23 and a spring 24 are determined by an effective mass and an effective spring of the sloshing which are functions of geometrical features of chambers in which the liquid is retained, depth of the liquid, and material of the liquid. Because these values are identical throughout chambers, effect of the sloshing in all the chambers is represented by a single mass-spring-dashpot system 27. Property of dashpot 25 is determined mainly by a viscosity of the liquid.

As far as the effective weight of the liquid is lower than 2% of the effective weight of the building, coupling effect between, the building and sloshing is negligible. Therefore, when the natural frequency of the building coincides with that of sloshing, so does the natural frequency of the coupled two-degree-of-freedom system. Natural requencies of sloshing Fs are determined as follows.

$$Fs = \sqrt{ks \cdot g \cdot \tanh(ks \cdot h)/2 \cdot pi}$$

ks : $(2n-1)$ pi/2a
n : order of the mode concerned
pi : ratio of a circumference to its diameter
2a : width of the tank in the direction of oscillation
g : gravity
h : depth of the water Natural frequency of the building Fb is determined as follows.

$$Fbn = \sqrt{Kn/Mn/2 \cdot pi}$$

wherein
Kn : modal stiffness of the building
Mn : modal mass of the building

Therefore, it becomes possible to set a natural frequency of sloshing equal to the natural frequency of the building by virtue of the above-mentioned equations.

The sloshing resonates with the vibration of the building when the building vibrates due to earthquakes etc. and the vibrational amplitude of the building is reduced by virtue of the vibration restraining structure.

In the above explanation, the vibrational characteristics of the building were represented by the first mode and the effects of the vibration restraining structure were explained on the basis for a simplicity of explanation. But application of the vibration restraining structure is not restricted to restrain the first mode but also applicable to restrain any other modes. In such cases, the vibration restraining structure had better be installed where the building displaces largely in the mode to be reduced. Consequently, the restraining structure is installed at an or at a plurality of intermediate floors.

Figure 6:
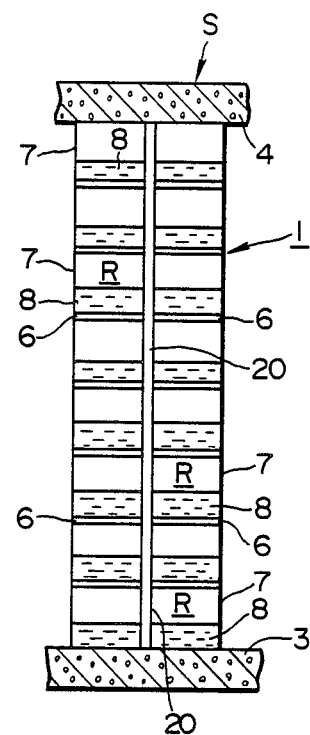
FIG. 6 is a transversal elevational view of the embodiment shown in FIG. 5.

FIG. 6 and FIG. 5 show a modified embodiment of the present invention. A feed water line 20 is provided vertically along a column 2 between the column 2 and a side plate 12. Inlet nozzles 21 connect the line 20 and the chambers R at an upper part of the chambers. A bottom end of the feed water line 20 is closed and the other end of the tube 20 is connected to a water supply means (not shown). At the other side of the structure 1, a drain water line 22 is provided between a column 2 and a side plate 12. Overflow nozzles 23 are connected at a predetermined elevation of each chamber R and connects the chambers R to the drain line 22.

The embodiment facilitates to fill the vibration restraining structure with water as explained below.

Water is lead to the chambers R adjacent to the feed water line 20 through the line 20 and the inlet nozzles 21. Then the water is lead to adjacent chambers R through the communication holes 9. When the surfaces 13 of water reaches the overflow nozzles 23, the water overflows through the nozzles 23, gathers in the drain water line 22 and is disposed.

This construction requires only to supply water through the feed water line 20. Then the chambers will be filled with prescribed amount of water. Water may be supplied after the structure is installed in the building. Therefore, construction of the structure becomes easier and more rapid.

Figure 7:
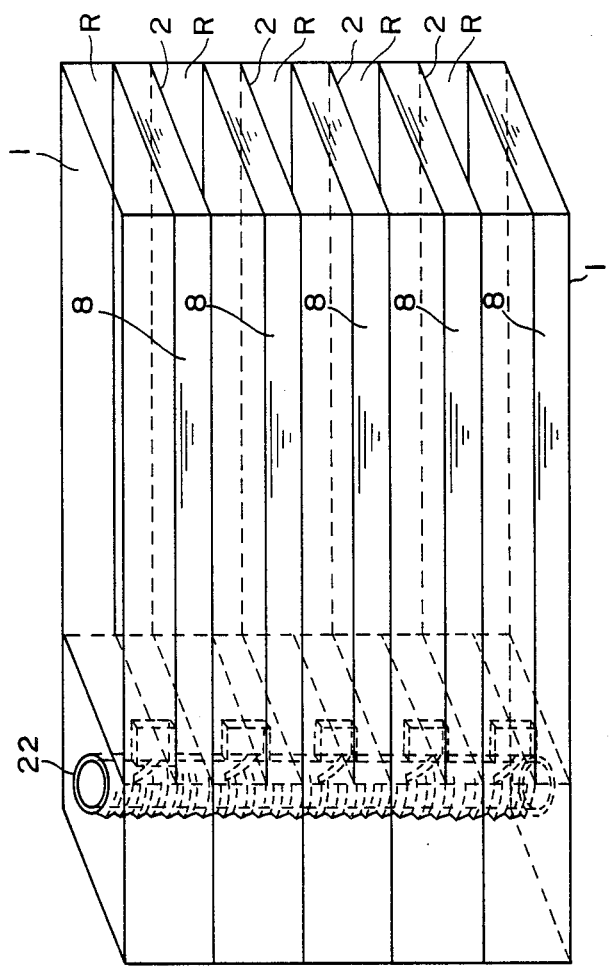
FIG. 7 is a perspective sketch of a further modified embodiment of the present invention.

FIGS. 7, 8 and 9 show a further modified embodiment of the invention. In the embodiment, the drain water line 22 comprises a cylindrical sleeve 30 and an inner tube 31. The inner tube 31 is rotatable about its axis within the cylindrical sleeve 30. Spiral slits 32 are formed in the cylindrical sleeve 30 and straight slits 33 are formed in the inner tube 31. An aperture 34 is formed where the straight slit 33 and the spiral slit 32 overlap each other, and the aperture 34 changes its elevation, along the spiral slit 32, as the inner tube 31 rotates.

By virtue of the above-mentioned construction, elevation of the aperture 34, through which the water in the chambers R are drained, is adjustable. Therefore, it becomes possible to adjust the depth of the water in the chambers by rotating the inner tube. Thus, it becomes easier to to adjust the natural frequency of sloshing which may be useful when fine adjusting the natural frequency.

An outer screw may be formed on an inner surface of the cylindrical sleeve 30 and an inner screw is formed on an outer surface of the inner tube 31 for a meshing engagement of them and for a spiral movement of the inner tube against the sleeve.

Natural frequency of the building differs naturally according to the mode. Therefore, geometry of the chamber retaining the liquid is determined so as to equate the sloshing natural frequency to the natural frequency of the building of the concerned mode.

Further, because the vibration restraining structure according to the present invention is compact, the structure can be installed in any floor of a building. Walls of the building may be replaced by the vibration restraining structures for more space saving.

Because the vibration restraining structure contains a considerable amount of liquid, the structure is effective as a sound insulative wall and a fireproof wall also.

The vibration restraining structure of the present invention is not necessarily installed in a building replacing a wall, but the structure may be installed on the top of the building or outside the building.

EXAMPLES

Figure 1:
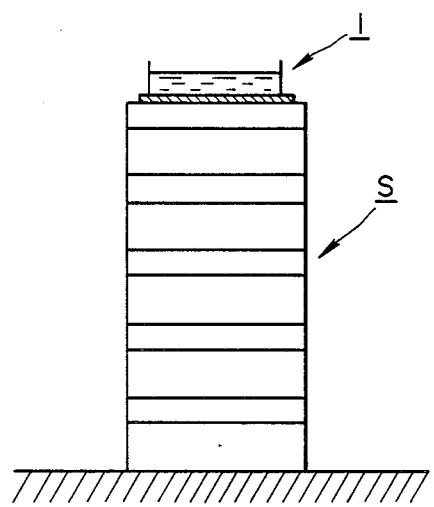
FIG. 1 shows a conventional vibration restraining structure applied to a five-story building.

Effects of the vibration restraining structure of the present invention have been verified by earthquake response analyses of buildings with and without the vibration restraining structure. The structure for analyses is a 5-story building model and a vibration restraining structure located at the top of the building as shown in FIG. 1. The building model has a mass of 400 kg at each floor. First natural period (reciprocal of first natural frequency) of the building is 0.41 seconds. Total effective weight of the liquid is 52 kg and the first sloshing period thereof is 0.41 seconds.

FIG. 10(A) shows a displacement time history at the fourth mass from bottom of the building without the vibration restraining structure responsive to the El Centro (NS) earthquake record. FIG. 10(B) shows a corresponding time history of the building provided with the vibration restraining structure. Comparison of the earthquake responses indicates that the response displacement of the building is reduced by virtue of a vibration restraining structure. Yet, vibration stabilizes more rapidly when the building is provided with the restraining structure.

Further analytical study shows that the effect of the vibration restraining structure is distinct when the effective mass of sloshing is larger than 0.5% of the effective mass of the building. It is also shown that when the effective mass of sloshing exceeds 2% of that of the building, natural frequency of the coupled system becomes different from the uncoupled structures and the vibration restraining effect decreases. In such cases, it is required to adjust sloshing frequency taking into account of the coupling effect of the structures. When the sloshing natural frequency is correctly adjusted, the vibration restraining effect can be obtained also in these cases.

What is claimed is:

1. A vibration-resistant building comprising:
   a framework of structural members;
   means for restraining vibration of said building, said restraining means including first and second wall members disposed parallel to each other and defining an inner space therebetween, a plurality of reservoirs positioned within said inner space, each of said reservoirs including a liquid therein, said liquid in each of said reservoirs having a free surface so as to be able to slosh within said reservoirs, the geometrics of said reservoirs and the depth of said liquid within each reservoir being such that the sloshing natural frequency of said liquid within each of said respective reservoirs coincides with a natural frequency of said building;
   said restraining means being supported by said framework, said restraining means includes at least one vertically oriented separation wall within said inner space, separating two of said reservoirs.

2. A building as defined in claim 1 wherein said separation wall includes a hole extending therethrough and establishing fluid communication between said two reservoirs, said hole being located beneath said free surface of said liquid in each of said two reservoirs.

3. A building as defined in claim 1 including a set of said reservoirs at the same elevation, a vertically oriented feed water line including an inlet nozzle in fluid communication with one of said set of reservoirs, and a drain line including an overflow nozzle in fluid communication with another of said set of reservoirs, said reservoirs defining said set being respectively separated from each other by a plurality of vertical separation walls, each of said vertical separation walls having a hole extending therethrough.

4. A building as defined in claim 1 wherein the weight of said liquid within said reservoirs is between one and two percent of the effective weight of the building.

5. A building in claim 1 wherein each of said reservoirs is defined by a horizontal top wall, a horizontal bottom wall, and two pairs of opposing vertical side walls connected to said bottom walls.

6. A building as defined in claim 1 wherein said vibration restraining means is a wall-like structure defined by said first and second wall members defining said inner space, and a plurality of separation walls with said inner space, said separation walls separating said inner space into a plurality of chambers, said reservoirs being defined by the walls of said chambers.

7. A building as defined in claim 6 including a plurality of vertically and horizontal disposed separation walls within said inner space which separate said reservoirs from each other.

8. A building as defined in claim 1 wherein each of said reservoirs has a substantially identical configuration, and said liquid within each of said reservoirs has the same depth.

9. A building as defined in claim 8 wherein a lowest sloshing natural frequency of said liquid coincides with a natural frequency of said building.

10. A building as defined in claim 9 wherein said building has a vibration mode such that its displacement under vibration is greater at a certain portion of said building than in other portions of said building, said restraining means being positioned at said certain portion of said building.

11. A building as defined in claim 1 including means for supplying liquid to said reservoirs and means for draining liquid from said reservoirs.

12. A building as defined in claim 11 wherein said draining means includes a cylindrical sleeve adjoining at least one of said reservoirs, said cylindrical sleeve including a cylindrical wall having an opening in fluid communication with said one of said reservoirs, and a cylindrical tube positioned within said cylindrical sleeve, said cylindrical tube being rotatable about its longitudinal axis and including a cylindrical wall, said cylindrical wall of said cylindrical tube including a spirally oriented slit which intersects said opening within said cylindrical wall of said cylindrical sleeve.

13. A building as defined in claim 12 wherein said cylindrical wall of said cylindrical sleeve has a threaded interior surface, and said cylindrical wall of said cylindrical tube has a threaded exterior surface engaged with said threaded interior surface of said cylindrical wall of said cylindrical sleeve.

14. A building as defined in claim 1 wherein said plurality of reservoirs includes a first set of reservoirs at a first elevation within said framework and a second set of reservoirs at a second elevation within said framework.

15. A building as defined in claim 14 wherein each of said reservoirs defining said first set of reservoirs are in fluid communication with each other.

16. A building as defined in claim 14 wherein each of said reservoirs has a substantially identical geometrical configuration.

17. A building as defined in claim 16 wherein said liquid within each of said reservoirs has the same depth.

18. A method for restraining the vibration of a building, comprising:
providing a plurality of reservoirs having selected geometrical configurations within said building; and
providing liquid within each of said reservoirs such that said liquid within each reservoir has a free upper surface, the geometrical configurations of said reservoirs and the depth of said liquid within each of said respective reservoirs being such that the sloshing natural frequency of said liquid within each of said respective reservoirs coincides with a natural frequency of said building.

19. A method as defined in claim 18 including the step of providing a plurality of said reservoirs at a location within said building where said building, due to its variation mode, undergoes greater displacement under vibration than other portions of said building.

20. A method as defined in claim 19 including the step of providing the same depth of water within each of said reservoirs and providing reservoirs having the same geometrical configurations.

21. A method as defined in claim 18 including the step of providing vibration restraining means within said building, said vibration restraining means including inner and outer wall members defining an inner space therebetween and separation wall disposed in said inner space, said separation walls defining said plurality of reservoirs.

22. A method as defined in claim 21 including a plurality of vertical and horizontal separation walls within said inner space.

* * * * *